US011425558B1

(12) United States Patent
Feldman et al.

(10) Patent No.: US 11,425,558 B1
(45) Date of Patent: *Aug. 23, 2022

(54) PRIVACY CENTRIC FEATURE ANALYSIS FOR MOBILE DEVICES

(71) Applicant: Quantcast Corporation, San Francisco, CA (US)

(72) Inventors: Konrad S. Feldman, San Francisco, CA (US); Daniel Vogel Fernandez de Castro, Mexico City (MX); Michael R. Blum, Piedmont, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,431

(22) Filed: Feb. 1, 2021

Related U.S. Application Data

(63) Continuation of application No. 16/706,305, filed on Dec. 6, 2019, now Pat. No. 10,911,947, which is a
(Continued)

(51) Int. Cl.
*H04W 12/02* (2009.01)
*H04W 4/029* (2018.01)
(Continued)

(52) U.S. Cl.
CPC ....... *H04W 12/02* (2013.01); *H04M 1/72463* (2021.01); *H04W 4/02* (2013.01);
(Continued)

(58) Field of Classification Search
CPC ....... H04W 12/02; H04W 4/02; H04W 4/021; H04W 4/023; H04W 4/029
See application file for complete search history.

(56) References Cited

U.S. PATENT DOCUMENTS 7,949,565 B1    5/2011  Eldering et al.
8,086,224 B2   12/2011  Zellner et al.
(Continued)

OTHER PUBLICATIONS

United States Office Action, U.S. Appl. No. 13/937,103, filed Jun. 9, 2015, 11 pages.
(Continued)

*Primary Examiner* — Brandon J Miller
(74) *Attorney, Agent, or Firm* — Andrea Wheeler

(57) ABSTRACT

Privacy centric feature analysis. A secure set of multiple mapped features is selected and provided to a mobile device. Each mapped feature maps a sharable feature to a matching criterion for an item of protected information and no combination of mapped features for a secure set are unique to an individual item of protected information. Privacy compliance instructions enable the mobile device to select a mapped feature from a received set of mapped features by identifying an item of protected information available to the mobile device which corresponds to a matching criterion found in the received set of mapped features. The sharable feature of the selected mapped feature is provided. Advantageously, the analysis system protects the privacy of the mobile device user because it does not require the mobile device to relay protected information for the selection of customized content or relevant advertisements.

21 Claims, 8 Drawing Sheets

Related U.S. Application Data continuation of application No. 16/252,451, filed on Jan. 18, 2019, now Pat. No. 10,506,427, which is a continuation of application No. 15/870,186, filed on Jan. 12, 2018, now Pat. No. 10,187,790, which is a continuation of application No. 15/638,755, filed on Jun. 30, 2017, now Pat. No. 9,906,951, which is a continuation of application No. 15/476,353, filed on Mar. 31, 2017, now Pat. No. 9,775,026, which is a continuation of application No. 15/371,746, filed on Dec. 7, 2016, now Pat. No. 9,763,085, which is a continuation of application No. 15/048,987, filed on Feb. 19, 2016, now Pat. No. 9,554,269, which is a continuation of application No. 14/826,618, filed on Aug. 14, 2015, now Pat. No. 9,313,656, which is a continuation of application No. 13/937,103, filed on Jul. 8, 2013, now Pat. No. 9,143,932.

(60) Provisional application No. 61/791,845, filed on Mar. 15, 2013.

(51) Int. Cl.
*H04W 4/02* (2018.01)
*H04M 1/72463* (2021.01)
*H04W 4/021* (2018.01)

(52) U.S. Cl.
CPC ........... *H04W 4/021* (2013.01); *H04W 4/023* (2013.01); *H04W 4/029* (2018.02)

(56) References Cited

U.S. PATENT DOCUMENTS

| | | | |
|---|---|---|---|
| 8,584,051 B1 * | 11/2013 | Alfaro | H04M 1/72457 715/752 |
| 8,626,201 B1 | 1/2014 | Wright et al. | |
| 9,026,145 B1 | 5/2015 | Duleba et al. | |
| 9,143,932 B1 | 9/2015 | Feldman et al. | |
| 9,313,656 B1 | 4/2016 | Feldman et al. | |
| 9,554,269 B1 | 1/2017 | Feldman et al. | |
| 9,763,085 B1 | 9/2017 | Feldman et al. | |
| 9,775,026 B1 | 9/2017 | Feldman et al. | |
| 9,906,951 B1 | 2/2018 | Feldman et al. | |
| 10,187,790 B1 * | 1/2019 | Feldman | H04W 4/02 |
| 10,506,427 B1 | 12/2019 | Feldman et al. | |
| 10,911,947 B1 * | 2/2021 | Feldman | H04W 4/021 |
| 2005/0202832 A1 | 9/2005 | Sudit | |
| 2007/0213034 A1 | 9/2007 | Cai et al. | |
| 2010/0223135 A1 | 9/2010 | Griffin et al. | |
| 2011/0201351 A1 | 8/2011 | Chen | |
| 2011/0300837 A1 | 12/2011 | Misiag | |
| 2013/0091016 A1 | 4/2013 | Shutter | |
| 2014/0236669 A1 | 8/2014 | Milton et al. | |
| 2014/0282814 A1 | 9/2014 | Barney et al. | |

OTHER PUBLICATIONS

United States Office Action, U.S. Appl. No. 14/826,618, filed Sep. 23, 2015, 8 pages.
United States Office Action, U.S. Appl. No. 15/048,987, filed May 31, 2016, 21 pages.
United States Office Action, U.S. Appl. No. 15/371,746, filed Jan. 26, 2017, 12 pages.
United States Office Action, U.S. Appl. No. 15/476,353, filed May 18, 2017, 12 pages.
United States Office Action, U.S. Appl. No. 15/638,755, filed Aug. 7, 2017, 18 pages.
United States Office Action, U.S. Appl. No. 16/252,451, filed Mar. 5, 2019, 23 pages.
United States Office Action, U.S. Appl. No. 15/870,186, filed Feb. 22, 2018, 19 pages.
United States Office Action, U.S. Appl. No. 16/706,305, filed Jun. 24, 2020, 12 pages.

* cited by examiner

| Mapping ID | Sharable Feature (Feature of City) | Description of an Item of Protected Information (Current Location of Mobile Device is inside City) |
|---|---|---|
| 201 | High Density Urban Area | City A, City B, City C, City D |
| 202 | Coastal Area | City E, City F, City G, City H |
| 203 | Suburban Area | City I, City J, City K, City L |
| 204 | Rural Area | City M, City N, City O, City P |

FIG. 2a

| Hierarchy of Information | Designation | Resource |
|---|---|---|
| Feature of City 221 | Sharable | Feature Analysis System provides a mapping of a feature to a list of cities |
| City Name 222 | Protected | External service receives RFI from mobile device with precise latitude and longitude OR street address, returns city name to mobile device |
| Street Address 223 | Protected | External service receives RFI from mobile device with precise latitude and longitude, returns street address to mobile device |
| Precise Latitude and Longitude 224 | Protected | available from GPS application on mobile device |

FIG. 2b

| Mapping ID | Sharable Feature (Scored Feature of Location) | Description of an Item of Protected Information (Current Location of Mobile Device within 5 miles of Position) |
|---|---|---|
| 211 | Feature E, score 10 | Position Q, Position R |
| 212 | Feature E, score 50 | Position S, Position T |
| 213 | Feature E, score 80 | Position U, Position V |
| 214 | Feature E, score 90 | Position W, Position X |

FIG. 2c

| Mapping ID | Sharable Feature (Feature with a range) | Description of an Item of Protected Information (Current Location of Mobile Device within 5 miles of Boundary) |
|---|---|---|
| 221 | Feature F "High", Feature G "50,000-75,000" | Boundary Q, Boundary R |
| 222 | Feature G "50,000-75,000", Feature H "Low" | Boundary S, Boundary T |
| 223 | Feature F "Low", Feature G "50,000-75,000" | Boundary U, Boundary V |
| 224 | Feature I "High", Feature J "High" | Boundary W, Boundary X |

Privacy compliance instructions are provided to the mobile device 120 (Step 510)

A secure set of mapped features is selected by the feature analysis system 100 (Step 520).

The secure set of mapped features is sent to the mobile device 120 (Step 530).

The privacy compliance instructions are executed at the mobile device 120 (Step 540).

One or more sharable features are received by the analysis system 100 and analyzed for subsequent action (Step 550).

Privacy compliance instructions are received by a mobile device 120 (Step 610).

A secure set of mapped features is received at a mobile device 120 from a feature analysis system 100 (Step 620).

A mapped feature from a received secure set of mapped features is selected by identifying an item of protected information available to the mobile device which corresponds to a matching criterion found in the received secure set of mapped features (Step 630).

A sharable feature of the selected mapped feature is identified (Step 640).

A sharable feature of the selected mapped feature is sent to a privacy compliant destination (Step 650).

FIG. 6

PRIVACY CENTRIC FEATURE ANALYSIS FOR MOBILE DEVICES

CROSS-REFERENCE TO RELATED APPLICATIONS

This application is a continuation of U.S. Non-Provisional application Ser. No. 16/706,305, entitled "Privacy Centric Feature Analysis for Mobile Devices" by Konrad Feldman, Daniel Vogel Fernandez de Castro and Michael Blum, filed on Dec. 6, 2019, which is a continuation of U.S. Non-Provisional application Ser. No. 16/252,451, entitled "Privacy Centric Feature Analysis for Mobile Devices" by Konrad Feldman, Daniel Vogel Fernandez de Castro and Michael Blum, filed on Jan. 18, 2019, now U.S. Pat. No. 10,506,427, issued on Dec. 10, 2019, which is a continuation of U.S. Non-Provisional application Ser. No. 15/870,186 entitled "Privacy Centric Feature Analysis for Mobile Devices" by Konrad Feldman, Daniel Vogel Fernandez de Castro and Michael Blum, filed on Jan. 12, 2018, now U.S. Pat. No. 10,187,790, issued on Jan. 22, 2019, which is a continuation of U.S. Non-Provisional application Ser. No. 15/638,755, entitled "Privacy Centric Feature Analysis for Mobile Devices" by Konrad Feldman, Daniel Vogel Fernandez de Castro and Michael Blum, filed on Jun. 30, 2017, now U.S. Pat. No. 9,906,951, issued on Feb. 27, 2018, which is a continuation of U.S. Non-Provisional application Ser. No. 15/476,353, entitled "Privacy Centric Feature Analysis for Mobile Devices" by Konrad Feldman, Daniel Vogel Fernandez de Castro and Michael Blum, filed on Mar. 31, 2017, now U.S. Pat. No. 9,775,026, issued on Sep. 26, 2017, which is a continuation of U.S. Non-Provisional application Ser. No. 15/371,746 entitled "Privacy Centric Feature Analysis for Mobile Devices" by Feldman et al., filed on Dec. 7, 2016, now U.S. Pat. No. 9,763,085, issued on Sep. 12, 2017, which is a continuation of U.S. Non-Provisional application Ser. No. 15/048,987, entitled "Privacy Centric Feature Analysis for Mobile Devices" by Feldman et al., filed on Feb. 19, 2016, now U.S. Pat. No. 9,554,269, issued on Jan. 24, 2017, which is a continuation of U.S. Non-Provisional application Ser. No. 14/826,618, entitled "Privacy Centric Feature Analysis for Mobile Devices" by Feldman et al., filed on Aug. 14, 2015, now U.S. Pat. No. 9,313,656, issued on Apr. 12, 2016, which is a continuation of U.S. Non-Provisional application Ser. No. 13/937,103, entitled "Privacy Centric Feature Analysis for Mobile Devices" by Feldman et al., filed on Jul. 8, 2013, now U.S. Pat. No. 9,143,932, issued on Sep. 22, 2015, which claims priority from U.S. Provisional Application No. 61/791,845, entitled "Privacy Centric Feature Analysis for Mobile Devices" by Feldman et al., filed on Mar. 15, 2013, all of which are hereby incorporated by reference in their entirety.

BACKGROUND

Field of Invention

The invention pertains in general to networked advertising and in particular to methods of protecting the privacy of mobile device users.

Description of Related Art

Information provided by mobile devices can be used for a number of purposes, such as understanding the way consumers interact with mobile devices and mobile applications, the selection of custom content and advertising targeting. However, consumers are rightfully concerned about privacy issues related to the types of information which may be collected and where that information may be transmitted.

Collecting the exact geolocation of a mobile device is just one example of the type of information collection which may make people understandably uncomfortable. What is needed is a method for enabling a mobile device to transmit enough information so that an analysis system can perform operations such as audience analysis, reporting, content customization and selecting advertisements for delivery to the mobile device, without compromising the privacy of the mobile device user.

SUMMARY

Embodiments of the invention provide a method, a non-transitory computer-readable storage medium and a system for the privacy centric feature analysis for mobile devices. In an embodiment, a secure set of two or more mapped features are selected for provision to a mobile device. A mapped feature maps a sharable feature to a matching criterion for an item of protected information. The mapped features of a secure set are selected such that no combination of the sharable features in a secure set are unique to an item of protected information. Advantageously, by careful selection of the mapped features of a secure set, the feature analysis system prevents the accidental collection of protected information.

In an embodiment, privacy compliance instructions are provided to the mobile device, for execution at the mobile device. The privacy compliance instructions direct the mobile device to select a mapped feature from a received secure set of mapped features by identifying an item of protected information available to the mobile device which corresponds to a matching criterion found in the secure set. The privacy compliance instructions direct the mobile device to identify a sharable feature of the selected mapped feature and send the sharable feature to a privacy compliant destination.

In an embodiment, at the privacy compliant destination, such as the analysis system or a third-party privacy compliant system, a sharable feature received from a mobile device may be used to perform subsequent analysis and actions such as, but not limited to, the selection of customized content for the mobile device, the selection of an advertisement for delivery to the mobile device, reporting, analysis and modeling. Advantageously, the mapped features may be designed to protect the privacy of the mobile device user by careful designation of the items of protected information and the careful selection of the sharable features.

In an embodiment, the feature analysis system may receive a response from a mobile device, with the response comprising one or more sharable features. The feature analysis system may select a new secure set of mapped featured for provision to the mobile device based on the presence or absence of a particular sharable feature in the response.

BRIEF DESCRIPTION OF DRAWINGS

Figure (FIG. 1 illustrates an example computing environment in accordance with an embodiment;

FIG. 2a illustrates an example of a list of mapped features;

FIG. 2b illustrates an example of a hierarchy of information related to a mapped feature and protected information, under a particular privacy policy, according to an embodiment;

FIG. 2c illustrates an example of a list of mapped features;

FIG. 2d illustrates an example of a list of mapped features;

FIG. 5 illustrates is a flow chart illustrating an example of a method for the privacy centric feature analysis for mobile devices, in accordance with an embodiment; and FIG. 6 illustrates is a flow chart illustrating an example of a method for the privacy centric feature analysis for mobile devices, in accordance with an embodiment.

DETAILED DESCRIPTION OF THE INVENTION

Figure 1:
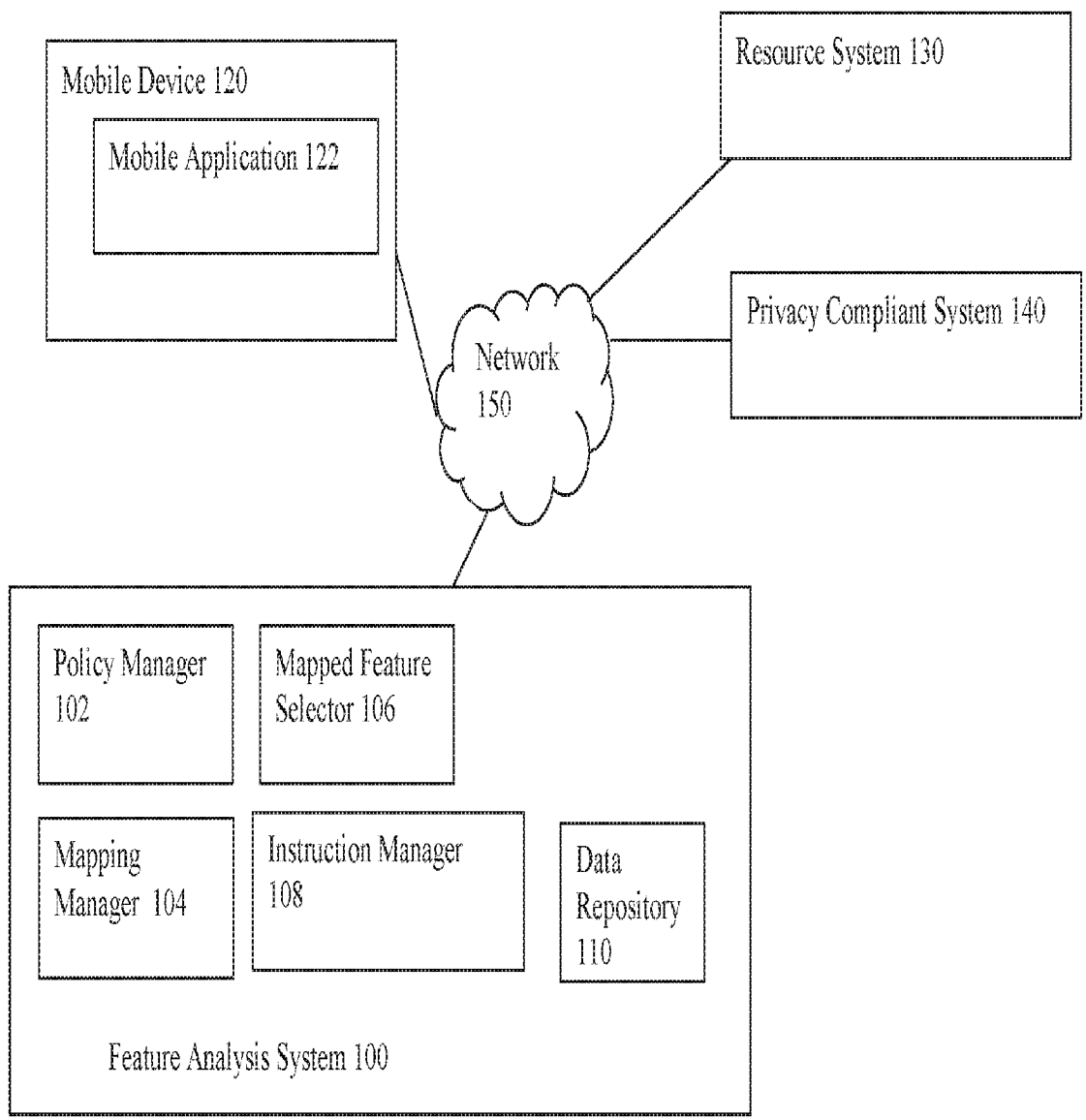

FIG. 1 illustrates an example computing environment in accordance with an embodiment. In particular, feature analysis system 100 can be used to help understand the features which are relevant to a mobile device without the collection of protected information, such as exact geolocation data, from the mobile device. Instead of collecting protected information from a mobile device at the analysis system, the feature analysis system provides the mobile device with privacy compliance instructions and mapped features which enable the mobile device to map protected information available to the mobile device, such as an exact geolocation of a mobile device, into a sharable feature, such as "near a beach resort", which may be shared with the feature analysis system, one or more privacy compliant systems or combinations thereof. By careful selection of mapped features at the feature analysis system, mapping between a first type of information, such as an exact geolocation, and a second type of information, such as a description common to multiple non-contiguous geographic locations, can enable the mobile device to share useful information without compromising consumer privacy. Advantageously, the sharable features can be used to select a mobile device to receive customized content or advertisements without compromising the privacy of the mobile device user.

As shown in FIG. 1, the computing environment includes a feature analysis system 100, a mobile device 120, a resource system 130 and a privacy compliant system 140. The feature analysis system 100, the mobile device 120, the resource system 130 and the privacy compliant system 140 are connected by a communication network 150, such as a local area network, a wide area network, a wireless network, an intranet, a cable network, a satellite network, a cellular phone network, an optical network, the Internet or combinations thereof.

In various embodiments, mobile device 120 receives and transmits data over the communication network 150. Examples of a mobile device 120 include, but are not limited to, a smartphone, mobile computer, laptop, computing tablet, personal digital assistant (PDA), portable gaming device, e-reading device and a cell phone. Although only one mobile device 120 is shown in FIG. 1 for clarity, any number of mobile devices may be connected to the communication network 150.

One or more mobile applications 122 may be installed on and operate on a mobile device 120. Examples of mobile applications include, but are not limited to, an internet browser, games, information retrieval applications and general productivity applications. Some mobile applications can detect or receive information from the mobile device hardware, mobile device operating system, mobile device firmware, systems integrated with the mobile device, input from the mobile device operator or combinations thereof. For example, a mobile application may have access to a status, a hardware identifier, a software identifier, or combinations thereof, accessed through a mobile operating system or firmware. A mobile application or a mobile device may have access to geolocation information accessed through a GPS (Global Positioning System) system integrated with or coupled to the mobile device. Geographic location may be accessed or inferred by a mobile application or mobile device from other sources instead of or in addition to GPS data, such as, but not limited to, information provided by a mobile device operator, triangulation from cell phone towers and accelerometer data.

Mobile device 120 can be associated with an identifier. For example, a hardware device identifier such as a Media Access Control Address (MAC address), International Mobile Station Equipment Identity (IMEI), Mobile Equipment Identifier (MEID) or Electronic Serial Number (ESN) can be stored on a device. A software identifier such as a cookie value, an application identifier, an application installation identifier or an operating system identifier such as an Android_ID and UDID can be stored locally on a mobile device. In some cases, an identifier value can be hashed for use by a feature analysis system 100 to produce an anonymous, non-reidentifiable identifier for the mobile device, providing an additional layer of privacy. In another embodiment, identifiers can be partially or wholly composed and/or stored remotely from a mobile device. In an example, identifiers do not comprise personally identifiable information (PII) such as a person's name or street address.

In some cases, a mobile device or a mobile application can be associated with a non-unique identifier. For example, a cohort of mobile devices with a common feature such as a device type, device model, device manufacturer, device feature capability, application version, application installation date, application manufacturer or application type may share a non-unique identifier. Information can be collected in conjunction with this non-unique identifier in order to preserve privacy for the consumer while providing useful information to marketers.

A resource system 130 receives requests for information from a mobile device 120 and makes information available to the mobile device 120. For example, a resource system 130 may receive a request from a mobile device 120 which includes a geolocation expressed in latitude and longitude, and return information to the mobile device, such as a street address which corresponds to the received latitude and longitude. Another example of a resource system may receive a street address and return a geolocation expressed in latitude and longitude. Another example of a resource system may receive geolocation information from a mobile device and return information, such as demographic or sociographic information, which correlates with the received geolocation. In an example, a resource system 130 can receive a request for information from a mobile device which does not include information related to the mobile device's geolocation, and provide information which correlates with the received information. [0026] In an embodiment, the feature analysis system 100 includes a policy manager 102, a mapping manager 104, a mapped feature selector 106, an instruction manager 108 and a data repository 110. Those of skill in the art will recognize that other embodiments of the feature analysis system 100 can include additional and/or different modules than the ones shown in FIG. 1. Moreover, the functionalities can be distributed among the modules in a different manner than described here.

A privacy policy comprises one or more protected information rules which can be used to differentiate between protected information (which should not be transmitted from a mobile device to a privacy compliant system) and sharable features (which may be transmitted from a mobile device to a privacy compliant system under the proper circumstances). In various embodiments, a privacy policy may apply to one or more individual mobile devices, one or more individual instances of an installed mobile application, one or more installation cohorts of a mobile application, or combinations thereof. In some cases, a single global privacy policy may be implemented for the feature analysis system 100. In some cases, a flat or hierarchical privacy policy may be implemented, with protected information rules configured by one or more entities, such as, but not limited to, mobile device operators, mobile device vendors, mobile application concerns, feature analysis system operators, privacy compliant system operators, mobile software application vendors, mobile software application developers, mobile software application distributors and mobile device software-as-a-service (SAAS) providers. In an embodiment, policy manager 102 manages the privacy policies. In some cases, one or more protected information rules may be maintained at the mobile device and applied to information sent from the mobile device to privacy compliant systems.

In an example, a protected information rule can be used to characterize information which is permitted to be sent from the mobile device to a privacy compliant destination such as the feature analysis system 100, a privacy compliant system 140 or both. For example a protected information rule can comprise a white list which identifies the sharable features which may be sent, which privacy compliant destinations a sharable feature may be sent to, or combinations thereof. For example, a mobile application vendor may establish a protected information rule which explicitly permits the mobile application to send the international mobile country code (a specific sharable feature in this example) to the feature analysis system 100 (a specific privacy compliant destination in this example).

In an example, a protected information rule can characterize information which is not permitted to be sent from the mobile device to a destination such as a privacy compliant destination, the feature analysis system 100 a privacy compliant system 140 or combinations thereof. For example a protected information rule can comprise a black list which identifies the protected information which may not be sent, prohibited destinations for protected information, or combinations thereof. For example, a single global privacy policy may be implemented for the feature analysis system 100 which prohibits the transmission of exact geolocation data from a mobile device to any destination.

Mapping manager 104 manages mapped features for the feature analysis system 100. A mapped feature maps one or more potentially sharable features to one or more matching criterion for an item of protected information. One or more mappings may be configured for the feature analysis system by an operator, provided by an external system, assembled by the feature analysis system or combinations thereof. In an example, the mappings may be generated based on data sources such as, but not limited to, US Census Data, marketing research and consumer histories of online behaviors.

The feature analysis system 100 can generate one or more mapped features, receive one or more mapped features or combinations thereof. FIG. 2a illustrates an example of a list of mapped features. In this example, the current location of a mobile device, as described by a city name, has been designated an item of protected information; the city name may not be transmitted from the mobile device to the feature analysis system 100. However, some features of the current location of the mobile device are sharable features. In this case, the sharable features ("high density urban area", "coastal area", "suburban area" and "rural area") are non-unique because knowledge of the feature does not uniquely identify the location of the mobile device.

FIG. 2b illustrates an example of a hierarchy of information related to a mapped feature and protected information, under a particular privacy policy, according to an embodiment. A feature of a city is a feature which may describe multiple different cities, such as population density (sparse, moderate, dense), climate zone (tropical, desert, sub-tropical, mesothermal, etc.) and a per capita income range. The hierarchy is listed in order of increasing level of specificity from the least specific (a feature of a city 221 is shared by every location in the city, and can be shared by other cities too) to the most specific (precise latitude and longitude 224 describes a highly accurate position). The designation of "non-unique sharable" or "protected" is derived from a particular privacy policy, so the designations for a hierarchy reflect the protected information rules of a particular privacy policy. Note also that a feature of the city 221 is not the same type of information as the geolocation information provided by a city name 222, a street address 223 or a precise latitude and longitude 224. Unlike a city name, which is a less precise description of a geolocation than a street address, a feature of the city 221 is not simply a lower resolution measure of the mapped item of protected information.

The resource column of hierarchy 220 describes where each item of information may be found. In some cases, an item of protected information can be found on the mobile device. For example, a GPS enabled mobile device may have recent GPS coordinates stored on the device and available to an application. In some cases, an item of protected information is available to a mobile device through an interaction with an external resource, such as resource system 130. For example, the street address or city name of the current location of a mobile device may not be stored on the device. In this case, the street address or city name of the current location of a mobile device may be made available to the mobile device through an interaction between the mobile device and one or more resource systems; for example, a mobile device may submit a request for information to a resource system 130 including the precise latitude and longitude of the mobile device's present location and the resource system 130 may make the street address, the name of the city, or both available to the mobile device. In this example, an item of protected information was used to access another item of protected information from an external resource. In some cases, one or more items of protected information may be used to access one or more items of protected information, one or more items of non-unique sharable information or combinations thereof.

In the list of mapped features of FIG. 2a, the sharable feature is an adjective descriptive of a geographic region. In other examples, the sharable feature may comprise a score or probability. For example, FIG. 2c illustrates an example of a list of mapped features where the sharable feature is accompanied by a score. FIG. 2d illustrates an example of a list of mapped features where the sharable features are accompanied by a range (50,000-75,000) or categorization ("high", "low").

A geographic location may be associated with a mobile device. For example, a geographic location may describe a past, current or predicted future location of the mobile device. In an example, a geographic location may be a position, set of positions, boundary or a region. A geographic location may be described in various ways such as, but not limited to, using absolute coordinates (such as a latitude and a longitude), relative coordinates, a street address, a direct market area (DMA) code, a zip code, an areal boundary, a perimeter, a boundary, one or more lines or combinations thereof. In an example, a geographic location can be a unique place name such as the name of a specific National Park, the unique name of a shopping mall, or a uniquely descriptive name of a store. In some cases, the geographic location can further comprise information related to an elevation or altitude. For example, elevation information may be useful for distinguishing a mobile device operator's location inside a multi-story building and enable configuration of elevation-specific mapped features.

For an item of protected information comprising a geographic location, a matching criterion may comprise a disposition describing the relative position of a geographic location with respect to a geographic location. Referring to FIG. 2a, the item of protected information is the current location of the mobile device, the matching criterion is "inside one of the listed cities"; in this example, the disposition is "inside". Referring to FIG. 2c, the item of protected information is the current location of the mobile device, the matching criterion is "within 5 miles of one of the listed positions"; in this example, the disposition is "within 5 miles".

In an example, a sharable feature may characterize an operator of a mobile device, a mobile device, a mobile application status, interactions with a mobile application, a past, present or predicted future location associated with a mobile device or combinations thereof. For example, a sharable feature may comprise sociographic, psychographic or demographic information such as the likelihood that a mobile device operator has an annual income of over $100,000. This type of sharable feature may be mapped to geographic locations using data such as census data. For example, a mobile device operator in the city of Beverley Hills may have a higher probability of making over $100,000 a year than a mobile device operator at any flea market. A feature may characterize the likely past, current or future behaviors of the operator of the mobile device. For example, it may be known that residents of some states check the weather report on their mobile devices with a higher frequency than residents of other states; in this case, the behavior "high frequency of checking the weather forecast from a mobile device" may be a sharable feature which can be mapped to some geographic locations, but not others.

A feature analysis system 100 may have access to a large number of mapped features The feature analysis system 100 carefully selects a secure set of mapped features for provision to a mobile device such that no combination of mapped features in the secure set is unique to an individual item of protected information. For example, before sending a set of mapped features to a mobile device comprising the three lists (200, 230 and 240) of mapped features illustrated in FIG. 2a and FIG. 2c and FIG. 2d, the feature analysis system must analyze the mapped features to ensure that the mobile device cannot accidentally disclose an item of protected information (the mobile device location) by providing a response including two or three sharable features which uniquely identify an individual location. List 200 describes a geographic location in terms of a city name; list 230 describes a geographic location in terms of a distance from a position; list 240 describes a geographic location in terms of a distance from a boundary. In the example of a secure set comprising lists 200, 230 and 240, the feature analysis system must analyze disparate geographic location specifications in the course of determining that no combination of mapped features in the set is unique to a geographic location.

In some cases, two or more secure sets of mapped features may be provided to a mobile device in sequence. To protect the privacy of the mobile device operator, the feature analysis system 100 may carefully select a new secure set of mapped features for provision to a particular mobile device such that no combination of mapped features from the combination of the new secure set and one or more secure sets of features previously provided to the particular mobile device are unique to an item of protected information. In some embodiments, the history of mapped features provided to a mobile device, or some portion thereof, may be maintained at the feature analysis system 100.

In some cases, an item of protected information may comprise a geographic location. To provide additional consumer privacy, a feature analysis system 100 may take care to carefully select the mapped features for a secure set of mapped features such that no combination of mapped features in the secure set is unique to a pair of contiguous locations. In this example, two nearby geographic locations, such as two adjacent neighborhoods or two adjacent cities may have one or more unusual features in common, so that sharing the one or more unusual features is tantamount to disclosing that the geographic location is limited to a small, localized pair of contiguous geographic locations. In an embodiment, the feature analysis system may be configured to carefully select the mapped features for a secure set of mapped features such that no combination of mapped features in the secure set is unique to a configurable number of two or more contiguous locations.

In use, some mobile devices such as cell phones may be subject to frequent location changes. For mapped features with a geolocation-related item of protected information, the passage of time confers some privacy protection. For example, with respect to the same secure set of mapped features, the set of sharable features received from a mobile phone at one point in time may be different at a second point in time due to a location change. For this reason, some degree of privacy may be maintained even when a comprehensive history of mapped features provided to a mobile device is not maintained at the feature analysis system 100.

The mapping of some sharable features to some items of protected information may be subject to frequent change. For example, a mapping between an item of protected information, such as an exact geolocation, and a sharable feature such as the crowd density value (low, medium, high) may vary with respect to the time-of-day. For example, at the food court inside a mall, the crowd density may be "high" at lunchtime and "low" at midnight, for days the mall is open. In another example, the likelihood that the mobile device operator is between the ages of 18 and 25 at a particular location may be sensitive to the season; for example, the likelihood of a mobile device operator being between the ages of 18 and 25 may be high during spring break at a popular beach resort, but lower during other times of the year.

In an example, the variability of sharable features over time may be managed by altering the mappings over time (map Daytona Beach and "high" likelihood of the mobile device operator being between the ages of 18-25 during spring break, but change the mapping to reflect "moderate" likelihood at other times of the year.) There are a variety of other ways to manage this. In another example, a resource system 130 may be used to keep track of this type of variability. For example, a resource system 130 may receive a request for information from mobile device which includes the name of the mobile device's location and returns a value representing the likelihood that the mobile device operator is between the ages of 18 and 25; the mobile device may subsequently provide the sharable feature (the value of the likelihood that the mobile device operator is between the ages of 18 and 25) to the feature analysis system 100.

Privacy compliance instructions are provided to the mobile device, for execution at the mobile device. In an embodiment, instruction manager 108 provides privacy compliance instructions for integration with a mobile application 122 or an operating system. Privacy compliance instructions which are integrated with a mobile application are executed on the mobile device and may be invoked by the mobile application or an operating system. In an example, the privacy compliance instructions can be provided to a mobile application developer in the form of a software developers kit (SDK) which can be integrated with a mobile application and then distributed for installation and execution on a mobile device. In some cases, the mobile application developer will distribute the privacy compliance instructions in conjunction with their mobile application for installation and execution on the mobile device. In some cases, a mobile device may have multiple mobile applications and each mobile application may operate its own set of privacy compliance instructions.

In an embodiment, the privacy compliance instructions may comprise a script. In an example, the script may be distributed to the mobile device in conjunction with an operating system, a software application or as part of a software application update. In an example, the script, or portions thereof, may be distributed over a network 150 to the mobile device 120.

Privacy compliance instructions are configured to enable the mobile device to receive a secure set of mapped features from the analysis system 100 and select a mapped feature by identifying an item of protected information available to the mobile device which corresponds to a matching criterion found in the received set of mapped features. As previously discussed, an item of protected information may be directly available to the mobile device, meaning it is available onboard the mobile device, such as an item which is stored on the mobile device; an item of information may be available to the mobile device through an interaction between the mobile device and software or hardware which is external to the mobile device, such as external resource system 140.

Identifying an item of protected information which corresponds to a matching criterion found in the received set of mapped features may mean determining if there is an exact match between a matching criterion and an item of protected information available to the mobile device. For example, if the item of protected information is the mobile device's exact geolocation, and the matching criterion is "any exact geolocation in Redondo Beach, Manhattan Beach or San Diego", the mobile device's exact location will only correspond to the matching criterion if the mobile device's geolocation is inside Redondo Bean, Manhattan Beach of San Diego, and meets the matching criterion exactly.

In an example, correspondence may be determined based on an inexact, approximate or probabilistic match. In an embodiment, the privacy compliance instructions may comprise instructions to evaluate one or more items of protected information available to the mobile device. For example, the privacy compliance instructions may include instructions for rating, scoring or ranking one or more items of protected information individually or collectively. In some cases, such a rating, score or rank may be used to determine if an item of protected information available to the mobile device corresponds to the matching criterion. In some cases, such a rating, score or rank may be sent to a privacy compliant destination such as feature analysis system 100, privacy compliant system 140 or both. In some cases, a rating, score or rank may be used at the mobile device to identify if one or more items of protected information correspond to the matching criterion based on an inexact, approximate or probabilistic match.

The privacy compliance instructions direct the mobile device to identify the sharable feature of the selected mapped feature and send the sharable feature to one or more privacy compliant destinations, such as the feature analysis system 100, privacy compliant system 140, or combinations thereof. In an example, the sharable feature may be sent to a privacy compliant destination in conjunction with one or more identifiers, such as a software identifier, a hardware identifier or combinations thereof. In some cases, the sharable feature may be sent to a privacy compliant destination in conjunction with a non-unique identifier, such as a cohort identifier common to a cohort of devices, applications or both. At the feature analysis system 100, information such as the received sharable feature may be used to perform subsequent analysis and actions such as, but not limited to, the selection of customized content for the mobile device, the selection of an advertisement for delivery to the mobile device, reporting and modeling. Similarly, additional information, such as a rating score or rank may be sent to the feature analysis system 100 and used to perform subsequent analysis and actions. Advantageously, the feature analysis system 100 protects the privacy of the mobile device user because it does not require the collection of protected information for the subsequent analysis or actions.

In an embodiment, the connectivity of the mobile device 120 may be taken into consideration before any data transmission to the mobile device is initiated by the feature analysis system 100. For example, in some cases, the feature analysis system 100 may refrain from transmitting data, such as the secure set of mapped features or any portion thereof, unless the mobile device 120 is coupled to a wireless network ("wi-fi") to avoid cellular phone data charges. In some cases, the feature analysis system 100 may adjust the size of the secure set of mapped features sent to the mobile device 120 based on one or more criteria such as the mobile device's bandwidth availability, the mobile device's memory availability, transmission costs, or combinations thereof. Similarly, the privacy compliant instructions may instruct the mobile device 120 to refrain from transmitting data, such as information requests to a resource system 130, sharable features to a feature analysis system 100, or both, unless the mobile device 120 is coupled to a wi-fi network.

In some cases, sequentially providing multiple small secure sets of mapped features to a mobile device instead of providing a large secure set of mapped features, allows the analysis system to pace resource usage. This technique can be used to avoid consuming too much network bandwidth and too much memory, power and processing resources at the mobile device at any given time.

In an embodiment, the privacy compliance instructions can include instructions to repeat the process of identifying one or more sharable features using the matching criterion found in a previously received secure set of mapped features. In some cases, repeating the process can include determining a score, rating or rank for one or more sharable features, either individually or collectively. A change in the updated sharable features may reflect movement of the mobile device 120, the time-dependent nature of a mapped feature, a change in the mobile application status, a change in the mobile device status or combinations thereof.

In some cases, new secure set of mapped features may be sent to a mobile device. As a result, new sharable features may be selected and sent to the mobile device for assessment, providing the analysis system with a view of the relevant features associated with a mobile device. In some cases, this may provide an increasingly detailed view of a mobile device, mobile device operator or mobile application status. However, because mobile devices may be in motion, sequential analysis introduces the possibility that sequential analyses are not executed with respect to the same location. Sharable features characteristic of one location may not be relevant to another location. Furthermore, the matching criterion for an item of protected information may change as a function of time, time of day or seasonality. For these reasons, sequential analysis may provide an updated set of sharable features or a new set of sharable features, however it does not necessarily provide an increasingly detailed view. Advantageously, the mobility of the devices, and the dynamic nature of the aforementioned relationships may introduce some degree of ambiguity into information which may be collected by a privacy compliant destination, and may provide an additional layer of privacy for the mobile device operator.

In some cases, the selection of a new secure set of mapped features may be based on the sharable features which are useful for a particular analysis or advertising campaign. In some cases, the selection may be based on the activity level of applications running on the mobile device or other information related to the hardware on the mobile device, the software on the mobile device, the engagement level of the operator of the mobile device, the media consumption history of the mobile device, the gross geographic location of the mobile device, or combinations thereof.

Sharable features received from the mobile device may be analyzed for a variety of purposes. For example, the mobile device or mobile device application may be selected to receive custom content or advertising content based on the presence or absence of one or more features in the relevant subset. In some cases, sharable features may be aggregated for sets of mobile device operators or a community of mobile application users, enabling the generation of sharable feature-related reporting. For example, the sharable features of all of the users of a mobile application may be aggregated to create a feature profile of that mobile application's users. The installation base of a mobile application may be broken out in a variety of ways, such as by usage style, engagement, the execution of one or more actions such as upgrading a service related to the mobile application or purchasing an item through the mobile application, and the sharable features of each subset of the mobile application's users may be aggregated to form a feature profile. Similarly, the sharable features of all of the users of a particular type of mobile device may be aggregated to create a feature profile for the owners of that device.

After sharable features are received from the mobile device at the feature analysis system 100, the sharable features may be grouped together into feature histories for analysis. For example, where there an identifier, such as an identifier for a mobile device, is permitted, a feature history for each respective mobile device may be created and maintained. Similarly, a feature history may be established for an individual instance of an installed mobile application, a set of applications running on an individual mobile device or a browser running on a mobile device. A feature history may be used to select advertisements for delivery to a mobile device or to select custom content for delivery to a mobile device. In some cases, sharable features may be received in conjunction with a non-unique identifier. A feature history may be created and maintained per non-unique identifier, enabling privacy-preserving cohort analysis and reporting at the feature analysis system.

Figure 3A:
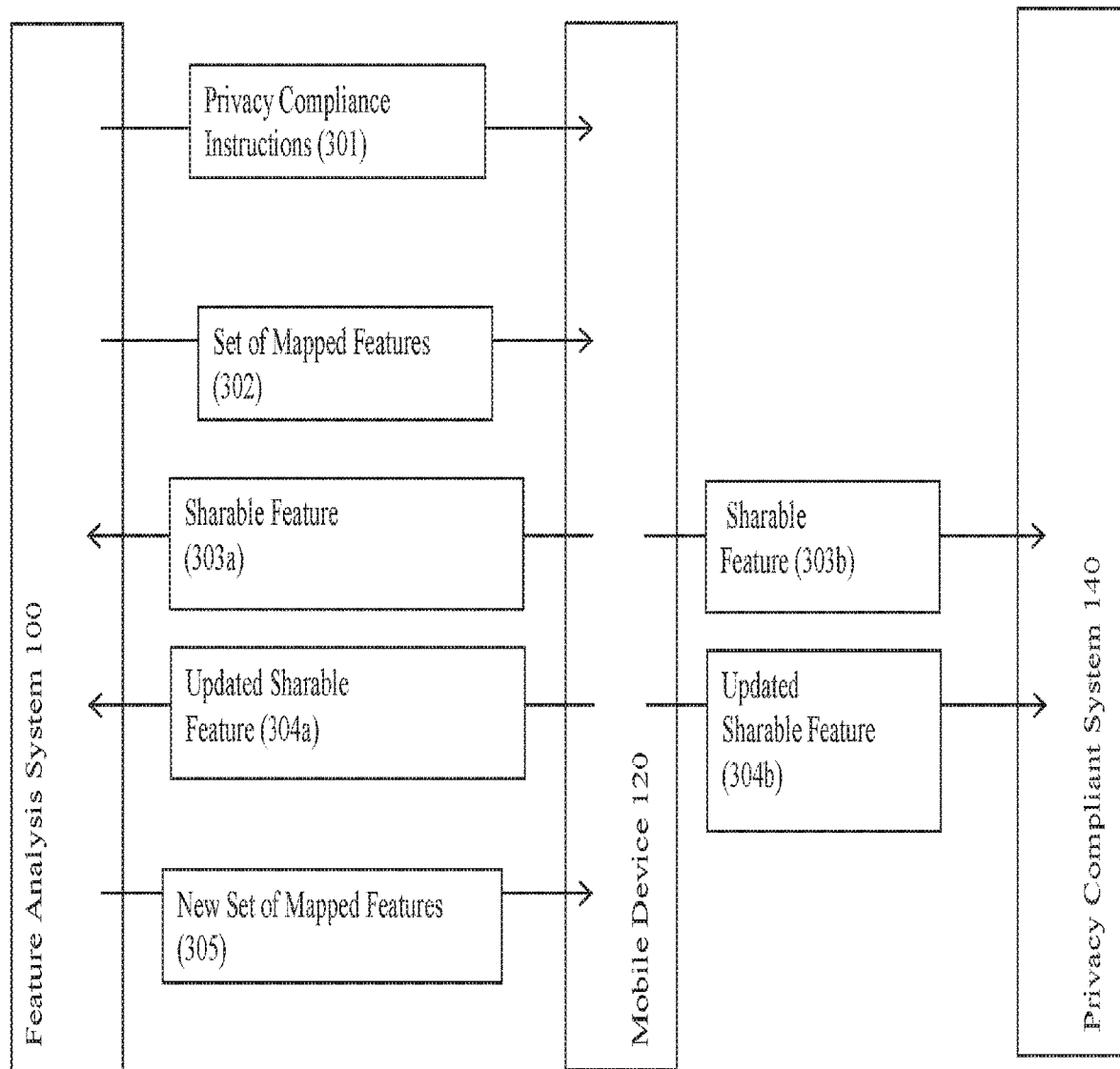
FIG. 3a illustrates an example of possible interactions between a feature analysis system, a mobile device and a privacy compliant system, according to an embodiment.

FIG. 3*a* illustrates an example of possible interactions between a feature analysis system 100, a mobile device 120 and a privacy compliant system 140, according to an embodiment. In this example, privacy compliance instructions are provided by the feature analysis system to the mobile device 120 (301). Some or all of the privacy compliance instructions may be provided directly from the feature analysis system 100 to the mobile device 120, indirectly through a third-party such as an application vendor, or combinations thereof.

A secure set of mapped features are selected for provision to the mobile device 120 by the feature analysis system 100 and sent to the mobile device 120 (302). One or more of the mapped features may be constructed at the feature analysis system 100.

Mobile device 120 executes the privacy compliance instructions and selects one or more sharable features by identifying an item of protected information available to the mobile device which corresponds to a matching criterion found in the received secure set of mapped features. In some cases, the mobile device may generate a score, rating or ranking based at least in part on an item of protected information available to the mobile device. Instructions used for generating a score, rating or ranking may be provided to the mobile device 120 by the feature analysis system 100 in conjunction with the secure set of mapped features, the privacy compliance instructions or both.

Mobile device 120 sends one or more sharable features to a privacy compliant destination, such as the feature analysis system 100 (303*a*), the privacy compliant system 140 (303*b*) or both. In some cases, additional information, such as a score, rating or ranking may be sent from the mobile device 120 in conjunction with the sharable feature. In some cases, an identifier may be sent from the mobile device 120 in conjunction with one or more sharable features.

The privacy compliance instructions may direct the mobile device 120 to re-assess a previously received secure set of mapped features. In some cases, re-assessment may be initiated according to a schedule, triggered by a signal received from an external resource such as the feature analysis system 100, triggered by a change in state of the mobile device or mobile application or combinations thereof. The mobile device selects one or more sharable features by identifying an item of protected information available to the mobile device which corresponds to a matching criterion found in the previously received secure set of mapped features. A set of updated sharable features may be sent to the feature analysis system 100 (304*a*), a privacy compliant system (304*b*) or both.

A new secure set of mapped features are selected for provision to the mobile device 120 by the feature analysis system 100 and sent to the mobile device 120 (305). In some cases, the new secure set of mapped features may be carefully selected, so that, subject to matching criteria from both the previously sent secure set of mapped features and the new secure set of mapped features, no combination of sharable features map to a unique item of protected information. In some cases, the new secure set of mapped features may be configured and/or selected based on a previously received sharable feature, the requirements of an advertising campaign, or both.

Figure 3B:
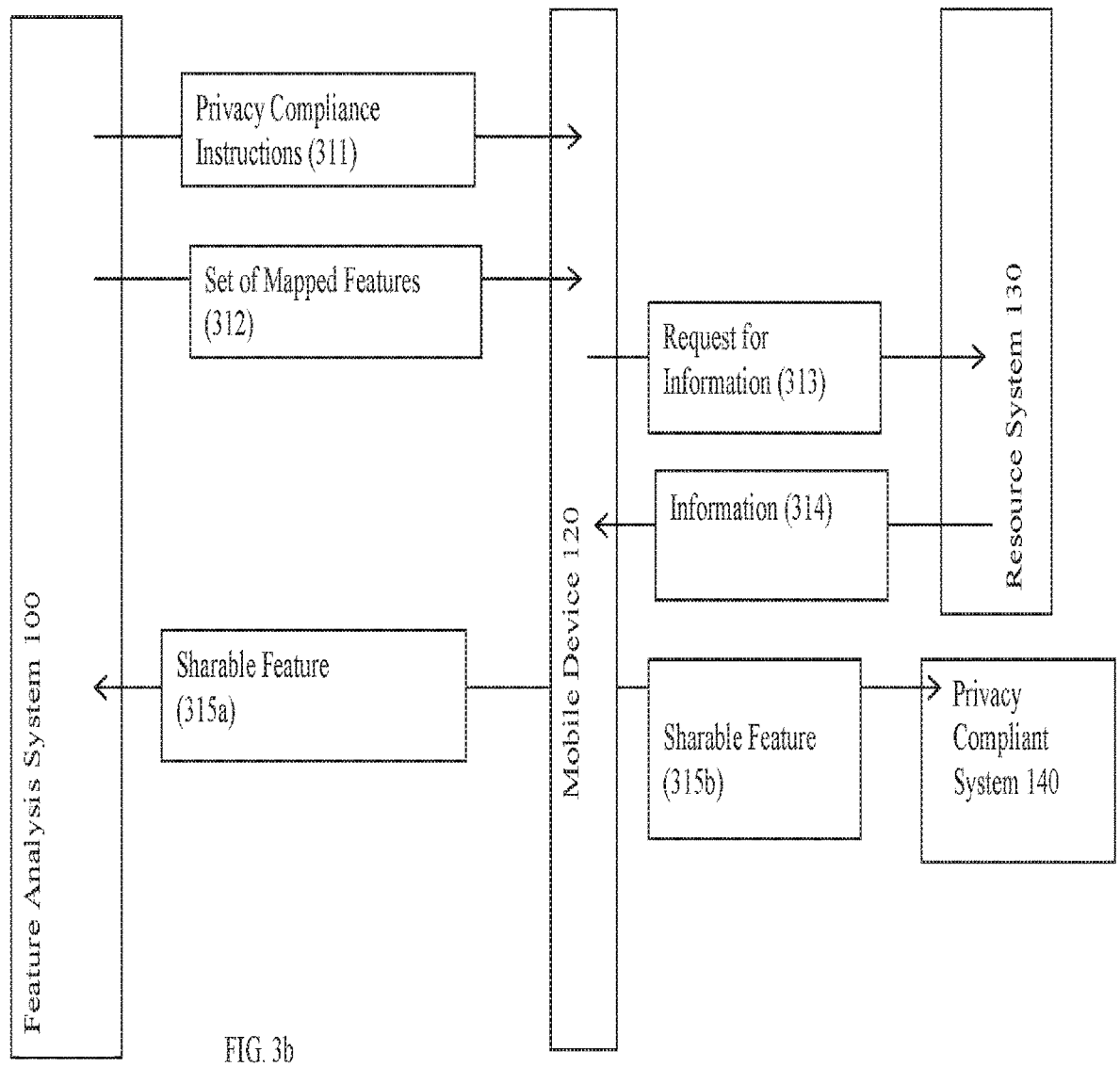
FIG. 3b illustrates an example of possible interactions between a feature analysis system, a mobile device, a resource system and a privacy compliant system, according to an embodiment.

FIG. 3*b* illustrates an example of possible interactions between a feature analysis system 100, a mobile device 120, a resource system 130 and a privacy compliant system 140, according to an embodiment. In this example, privacy compliance instructions are provided by the feature analysis system to the mobile device 120 (311). As previously discussed, some or all of the privacy compliance instructions may be provided directly from the feature analysis system 100 to the mobile device 120, indirectly through a third-party such as an application vendor, or combinations thereof. The privacy compliance instructions may or may not include a partial or complete hierarchy of information which may be used by the mobile device 120 to request information from a resource system. For example, a request for information may be sent to a resource system, and may include information stored on the mobile device.

A secure set of mapped features are selected for provision to the mobile device 120 by the feature analysis system 100 and sent to the mobile device 120 (312). In some cases a partial or complete hierarchy of information may be sent to the mobile device 120, in conjunction with the secure set of mapped features.

Mobile device 120 executes the privacy compliance instructions. As a result, a request for information is sent to a resource system 130 (313). The request for information may include information such as one or more items of protected information available to the mobile device 120. The privacy compliance instructions direct the mobile device to selects one or more sharable features by identifying an item of protected information available to the mobile device which corresponds to a matching criterion found in the received secure set of mapped features. In some cases, the item of protected information described in a mapped feature may be available to the mobile device through an interaction with an external resource, such as a resource system 130. The hierarchy can be used by the mobile device to configure a request for information, and may include details such as where to submit a request for information and how to format the request.

Resource system 130 receives the request for information, including one or more items of information such as an item of protected information, and sends information back to the mobile device 120 (314). In some cases, the information sent back to the mobile device 120 may comprise an item of protected information. In some cases, the information sent back to the mobile device 120 may comprise a sharable feature. In an example, the resource system 130 receives an exact geolocation from the mobile device 120 and returns a street address. In another example, the resource system 130 receives an exact geolocation from a mobile device 120 and returns the minimum driving time between the exact geolocation and the closest storefront of a chain of coffee shops under current traffic conditions.

Mobile device 120 receives the information from the resource system 130 and uses this information to select one or more sharable features by identifying an item of protected information available to the mobile device which corresponds to a matching criterion found in the received secure set of mapped features. The mobile device 120 sends one or more sharable features to a privacy compliant destination, such as the feature analysis system 100 (315*a*), the privacy compliant system 140 (315*b*) or both. In some cases, additional information, such as a score, rating or ranking may be sent from the mobile device 120 in conjunction with a sharable feature. In some cases, an identifier may be sent from the mobile device 120 in conjunction with one or more sharable features.

Figure 4:
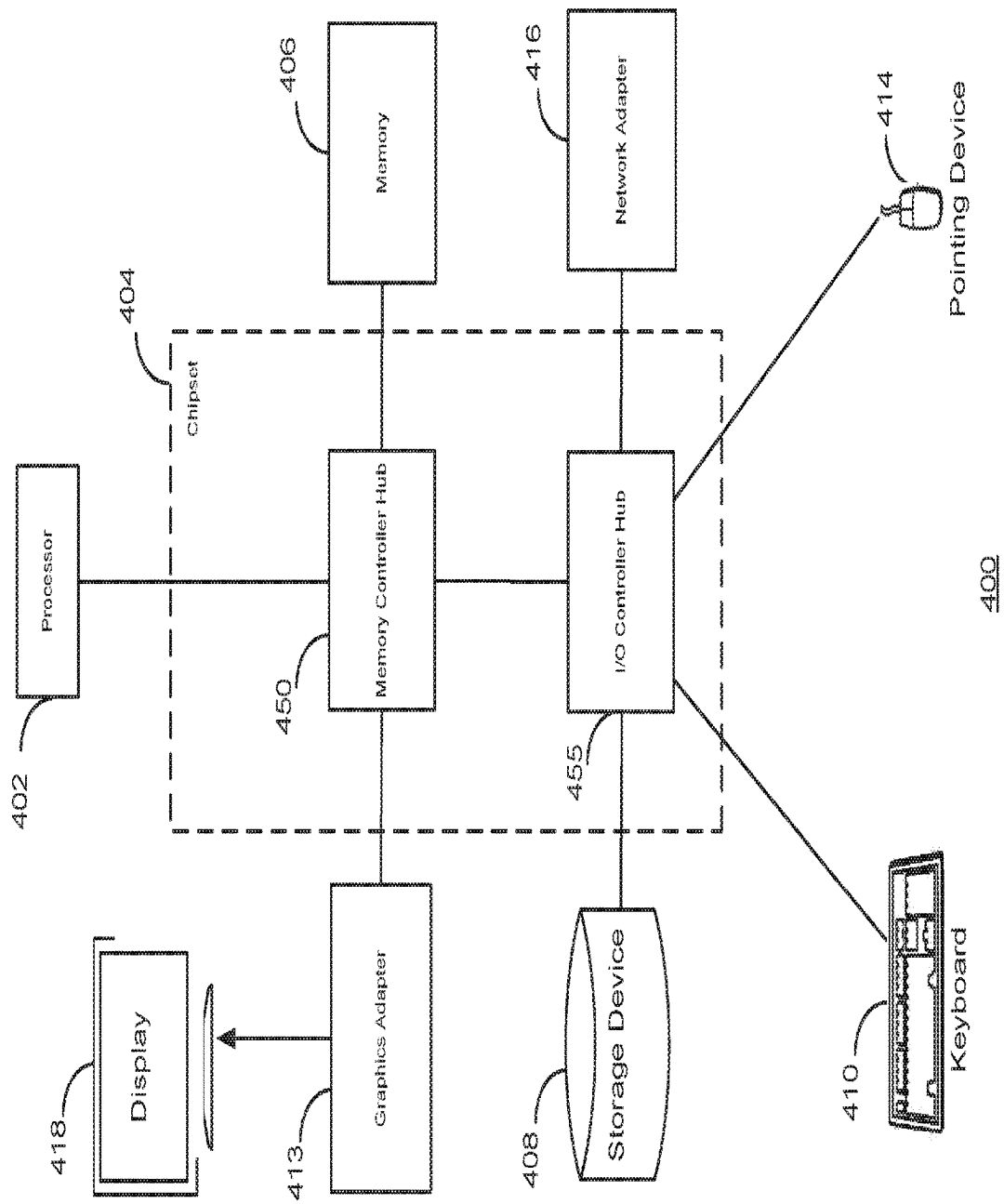
FIG. 4 is a high-level block diagram illustrating an example of a computer for use as a feature analysis system, a mobile device, a resource system and/or a privacy compliant system of FIG. 1, FIG. 3a and FIG. 3b.

FIG. 4 is a high-level block diagram illustrating an example of a computer 400 for use as a feature analysis system 100, a mobile device 120, a resource system 130 and/or a privacy compliant system 140 of FIG. 1, FIG. 3*a* and FIG. 3*b*, in accordance with an embodiment of the invention. Illustrated are at least one processor 402 coupled to a chipset 404. The chipset 404 includes a memory controller hub 450 and an input/output (I/O) controller hub 455. A memory 406 and a graphics adapter 413 are coupled to the memory controller hub 450, and a display device 418 is coupled to the graphics adapter 413. A storage device 408, keyboard 410, pointing device 414, and network adapter 416 are coupled to the I/O controller hub 455. Other embodiments of the computer 400 have different architectures. For example, the memory 406 is directly coupled to the processor 402 in some embodiments.

The storage device 408 is a computer-readable storage medium such as a hard drive, compact disk read-only memory (CD-ROM), DVD, or a solid-state memory device. The memory 406 holds instructions and data used by the processor 402. The pointing device 414 is used in combination with the keyboard 410 to input data into the computer system 400. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 413 displays images and other information on the display device 418. In some embodiments, the display device 418 includes a touch screen capability for receiving user input and selections. The network adapter 416 couples the computer system 400 to the communications network 101. Some embodiments of the computer 400 have different and/or other components than those shown in FIG. 4.

The computer 400 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 408, loaded into the memory 406, and executed by the processor 402.

The types of computers 400 used by the entities of FIG. 1 and FIG. 3*a* and FIG. 3*b* can vary depending upon the embodiment and the processing power used by the entity. For example, a mobile device 110 that is cell phone or PDA typically has limited processing power, a small display 418, and might lack a pointing device 414. The feature analysis system 100, in contrast, may comprise multiple blade servers working together to provide the functionality described herein.

FIG. 5 is a flow chart illustrating an example of a method 500 for feature analysis, according to an embodiment. Referring to Step 510, privacy compliance instructions are provided to the mobile device 120.

Referring to Step 520, a secure set of mapped features is selected by the feature analysis system 100.

Referring to Step 530, the secure set of mapped features is sent to the mobile device 120.

Referring to Step 540, the privacy compliance instructions are executed at the mobile device 120. This causes the mobile device to select one or more sharable features by identifying an item of protected information available to the mobile device which corresponds to a matching criterion found in the received secure set of mapped features. One or more sharable features of the selected mapped feature are identified. One or more sharable features are sent to a privacy compliant destination, such as the feature analysis system 100, a privacy compliant system 140 or combinations thereof.

Referring to Step 550, one or more sharable features are received by the analysis system 100 and analyzed for subsequent action.

FIG. 6 is a flow chart illustrating an example of a method 600 enabling feature analysis for mobile devices, according to an embodiment. Referring to Step 610, privacy compliance instructions are received by a mobile device 120.

Referring to Step 620, a secure set of mapped features is received at a mobile device 120 from a feature analysis system 100.

Referring to Step 630, a mapped feature from a received secure set of mapped features is selected by identifying an item of protected information available to the mobile device which corresponds to a matching criterion found in the received secure set of mapped features.

Referring to Step 640, a sharable feature of the selected mapped feature is identified.

Referring to Step 650, a sharable feature of the selected mapped feature is sent to a privacy compliant destination.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method, comprising:
providing, to a mobile application installed on a mobile device, a first set of mapped features comprising a plurality of items of protected information, each item of protected information mapped to at least one non-unique sharable feature; and
providing privacy compliance instructions to the mobile application for execution at the mobile device, wherein the privacy compliance instructions comprise instructions for:
responsive to accessing, by the mobile application, a first item of information corresponding to a first item of protected information of the plurality of items of protected information:
selecting, by the mobile application, at least one non-unique sharable feature from the at least one non-unique shareable features mapped to the first item of protected information; and
providing, by the mobile application, the at least one non-unique sharable feature.

2. The method of claim 1, further comprising:
receiving the at least one non-unique sharable feature from the mobile application;
selecting content according to the at least one non-unique sharable feature; and
sending the selected content to the mobile application.

3. The method of claim 1, further comprising:
providing, to the mobile application, a second set of mapped features comprising the plurality of items of protected information, the first item of protected information mapped to at least one new non-unique sharable feature that was not in the first set of mapped features; and
providing updated privacy compliance instructions, wherein the updated privacy compliance instructions further comprise instructions for:
responsive to accessing, by the mobile application, the first item of information corresponding to the first item of protected information of the plurality of items of protected information:
selecting, by the mobile application, at least one new non-unique sharable feature from the at least one new non-unique shareable features mapped to the first item of protected information; and
providing, by the mobile application, the at least one new non-unique sharable feature.

4. The method of claim 3, wherein no combination of the at least one non-unique sharable feature and the at least one new non-unique shareable feature is unique to the first item of protected information.

5. The method of claim 4, further comprising:
receiving the at least one non-unique sharable feature and the at least one new non-unique sharable feature from the mobile application;
selecting content according to the at least one non-unique sharable feature and the at least one new non-unique sharable feature; and
sending the selected content to the mobile application.

6. The method of claim 3, wherein providing, to the mobile application, the second set of mapped features is responsive to receiving notification of a change in a location of the mobile device.

7. The method of claim 3, wherein providing, to the mobile application, the second set of mapped features is responsive to receiving notification of a change in a time-dependent aspect of the first item of protected information.

8. A non-transitory computer-readable storage medium storing processor-executable computer program instructions that, when executed, cause a computer processor to perform a method, the method comprising:
providing, to a mobile application installed on a mobile device, a first set of mapped features comprising a plurality of items of protected information, each item of protected information mapped to at least one non-unique sharable feature; and providing privacy compliance instructions, to the mobile application for execution at the mobile device, wherein the privacy compliance instructions comprise instructions for:
responsive to accessing, by the mobile application, a first item of information corresponding to a first item of protected information of the plurality of items of protected information:
selecting, by the mobile application, at least one non-unique sharable feature from the at least one non-unique shareable features mapped to the first item of protected information; and
providing, by the mobile application, the at least one first non-unique sharable feature.

9. The medium of claim 8, wherein the method further comprises:
receiving the at least one non-unique sharable feature from the mobile application;
selecting content according to the at least one non-unique sharable feature; and
sending the selected content to the mobile application.

10. The medium of claim 8, wherein the method further comprises:
providing, to the mobile application, a second set of mapped features comprising the plurality of items of protected information, the first item of protected information mapped to at least one new non-unique sharable feature that was not in the first set of mapped features; and
providing updated privacy compliance instructions wherein the updated privacy compliance instructions further comprise instructions for:
responsive to accessing, by the mobile application, the first item of information corresponding to the first item of protected information of the plurality of items of protected information:
selecting, by the mobile application, at least one new non-unique sharable feature from the at least one new non-unique shareable features mapped to the first item of protected information; and
providing, by the mobile application, the at least one new non-unique sharable feature.

11. The medium of claim 10, wherein no combination of the at least one non-unique sharable feature and the at least one new non-unique shareable feature is unique to the first item of protected information.

12. The medium of claim 11, wherein the method further comprises:
receiving the at least one non-unique sharable feature and the at least one new non-unique sharable feature from the mobile application;
selecting content according to the at least one non-unique sharable feature and the at least one new non-unique sharable feature; and
sending the selected content to the mobile application.

13. The medium of claim 10, wherein providing, to the mobile application, the second set of mapped features is responsive to receiving notification of a change in a location of the mobile device.

14. The medium of claim 10, wherein providing, to the mobile application, the second set of mapped features is responsive to receiving notification of a change in a time-dependent aspect of the first item of protected information.

15. A system comprising:
a processor; and
a non-transitory computer-readable storage medium storing processor-executable computer program instructions that, when executed, cause a computer processor to perform a method, the method comprising:
providing, to a mobile application installed on a mobile device, a first set of mapped features comprising a plurality of items of protected information, each item of protected information mapped to at least one non-unique sharable feature; and
providing privacy compliance instructions to the mobile application for execution at the mobile device, wherein the privacy compliance instructions comprise instructions for:
responsive to accessing, by the mobile application, a first item of information corresponding to a first item of protected information of the plurality of items of protected information:
selecting, by the mobile application, at least one non-unique sharable feature from the at least one non-unique shareable features mapped to the first item of protected information; and
providing, by the mobile application, the at least one non-unique sharable feature.

16. The system of claim 15, wherein the privacy compliance instructions further comprise instructions for:
receiving the at least one non-unique sharable feature from the mobile application;
selecting content according to the at least one non-unique sharable feature; and
sending the selected content to the mobile application.

17. The system of claim 15, wherein the method further comprises:
providing, to the mobile application, a second set of mapped features comprising the plurality of items of protected information, the first item of protected information mapped to at least one new non-unique sharable feature that was not in the first set of mapped features; and
providing updated privacy compliance instructions wherein the updated privacy compliance instructions further comprise instructions for:
responsive to accessing, by the mobile application, the first item of information corresponding to the first item of protected information of the plurality of items of protected information:
selecting, by the mobile application, at least one new non-unique sharable feature from the at least one new non-unique shareable features mapped to the first item of protected information; and
providing, by the mobile application, the at least one new non-unique sharable feature.

18. The system of claim 17, wherein no combination of the at least one non-unique sharable feature and the at least one new non-unique shareable feature is unique to the first item of protected information.

19. The system of claim 18, wherein the privacy compliance instructions further comprise instructions for:
receiving the at least one non-unique sharable feature and the at least one new non-unique sharable feature from the mobile application;
selecting content according to the at least one non-unique sharable feature and the at least one new non-unique sharable feature; and
sending the selected content to the mobile application.

20. The system of claim 17, wherein providing, to the mobile application, the second set of mapped features is responsive to receiving notification of a change in a location of the mobile device.

21. The system of claim 17, wherein providing, to the mobile application, the second set of mapped features is responsive to receiving notification of a change in a time-dependent aspect of the first item of protected information.

* * * * *